United States Patent
Knebel et al.

(10) Patent No.: US 9,772,481 B2
(45) Date of Patent: Sep. 26, 2017

(54) ARRANGEMENT FOR USE IN THE ILLUMINATION OF A SPECIMEN IN SPIM MICROSCOPY

(71) Applicants: Werner Knebel, Kronau (DE); Frank Sieckmann, Bochum (DE); Bernd Widzgowski, Dossenheim (DE); Wernher Fouquet, Mannheim (DE)

(72) Inventors: Werner Knebel, Kronau (DE); Frank Sieckmann, Eppingen (DE); Bernd Widzgowski, Dossenheim (DE); Wernher Fouquet, Mannheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 556 days.

(21) Appl. No.: 14/354,601

(22) PCT Filed: Oct. 22, 2012

(86) PCT No.: PCT/EP2012/070866
§ 371 (c)(1),
(2) Date: Apr. 28, 2014

(87) PCT Pub. No.: WO2013/060644
PCT Pub. Date: May 2, 2013

(65) Prior Publication Data
US 2014/0300958 A1 Oct. 9, 2014

(30) Foreign Application Priority Data

Oct. 28, 2011 (DE) .................. 10 2011 054 914
Oct. 9, 2012 (DE) .................. 10 2012 109 577

(51) Int. Cl.
*G02B 21/06* (2006.01)
*G02B 21/00* (2006.01)
(Continued)

(52) U.S. Cl.
CPC ..... *G02B 21/0032* (2013.01); *G02B 21/0036* (2013.01); *G02B 21/0076* (2013.01);
(Continued)

(58) Field of Classification Search
CPC .... G02B 21/06; G02B 21/0076; G02B 21/16; G02B 21/0032; G02B 21/367;
(Continued)

(56) References Cited

U.S. PATENT DOCUMENTS

| 5,903,781 A | 5/1999 | Huber |
| 6,064,518 A | 5/2000 | Stelzer |

(Continued)

FOREIGN PATENT DOCUMENTS

| DE | 19632040 A1 | 2/1998 |
| DE | 19834279 A1 | 3/2000 |

(Continued)

OTHER PUBLICATIONS

Bruns, et al., Preparation strategy and illumination of three-dimensional cell cultures in light sheet-based fluorescence microscopy, Journal of Biomedical Optics 17 (10), Sep. 14, 2012.

(Continued)

*Primary Examiner* — Joseph P Martinez
*Assistant Examiner* — Sharrief Broome
(74) *Attorney, Agent, or Firm* — Leydig, Voit & Mayer, Ltd.

(57) ABSTRACT

An arrangement for use in illuminating a sample in SPIM microscopy includes an illumination objective configured to receive and focus a light strip or a quasi-light strip. The quasi-light strip is made up of a light bundle continuously moved back and forth in a light-strip plane. A deflection apparatus is configured to deflect the light strip or the quasi-light strip, after the light strip or the quasi-light strip has passed through the illumination objective, in such a way (Continued)

that the light strip or the quasi-light strip propagates at an angle different from zero degrees with respect to an optical axis of the illumination objective. The illumination objective and the deflection apparatus are arranged movably relative to one another.

21 Claims, 11 Drawing Sheets

(51) Int. Cl.
*G02B 21/08* (2006.01)
*G02B 21/10* (2006.01)
*G02B 21/16* (2006.01)
*G02B 21/36* (2006.01)

(52) U.S. Cl.
CPC .......... *G02B 21/084* (2013.01); *G02B 21/10* (2013.01); *G02B 21/16* (2013.01); *G02B 21/367* (2013.01)

(58) Field of Classification Search
CPC ...... G02B 21/26; G02B 21/008; G02B 21/14; G02B 21/361; G02B 27/58; G02B 21/0048; G02B 21/34; G02B 21/025; G02B 21/002; G02B 21/0072; G02B 21/365; G02B 21/004
USPC ................ 359/385, 380, 368, 381, 391, 433
See application file for complete search history.

(56) References Cited

U.S. PATENT DOCUMENTS

| | | |
|---|---|---|
| 2003/0002148 A1 | 1/2003 | Engelhardt |
| 2006/0012866 A1* | 1/2006 | Wolleschensky .... G02B 21/082 359/385 |
| 2007/0229946 A1* | 10/2007 | Okada ................ G01N 21/6458 359/385 |
| 2010/0067102 A1* | 3/2010 | Yokoi ................ G01N 21/6458 359/385 |
| 2010/0315613 A1* | 12/2010 | De Wit ................ G01N 21/956 355/67 |
| 2011/0031414 A1 | 2/2011 | Lippert |
| 2011/0235169 A1 | 9/2011 | Lim et al. |
| 2014/0042339 A1 | 2/2014 | Stelzer et al. |

FOREIGN PATENT DOCUMENTS

| | | |
|---|---|---|
| DE | 10257423 A1 | 6/2004 |
| DE | 102004034957 A1 | 2/2006 |
| DE | 102008018476 A1 | 10/2009 |
| WO | WO 0025171 A2 | 5/2000 |
| WO | WO 2010012980 A1 | 2/2010 |
| WO | WO 2014026683 A1 | 2/2014 |

OTHER PUBLICATIONS

Boocock, et al., A simple chamber of observing microscopic specimens in both top and side view, Journal of Micrscopy, 137, Jan. 1985.

* cited by examiner

ARRANGEMENT FOR USE IN THE ILLUMINATION OF A SPECIMEN IN SPIM MICROSCOPY

CROSS-REFERENCE TO PRIOR APPLICATIONS

This application is a U.S. National Phase Application under 35 U.S.C. §371 of International Application No. PCT/EP2012070866 filed on Oct. 22, 2012, and claims benefit to German Patent Application No. DE 10 2011 054 914.5 filed on Oct. 28, 2011 and to German Patent Application No DE 10 2012 109 577.9 filed on Oct. 9, 2012. The International Application was published in German on May 2, 2013 as WO 2013060644 A1 under PCT Article 21(2).

FIELD

The invention relates to an arrangement for use in the illumination of a sample in SPIM microscopy, having an illumination objective that receives and focuses a light strip or a quasi-light strip which is made up of a light bundle continuously moved back and forth in in a light-strip plane.

BACKGROUND

A microscope operating according to the SPIM method is described in DE 102 57 423 A1. In this microscope, a sample is illuminated by a thin light strip, while observation takes place perpendicularly to the plane of the illuminating light strip. Here, illumination and detection are carried out via two separate optical paths each having separate optics, in particular having two separate objectives perpendicular to each other. The light strip is produced by the illumination objective and a cylindrical optic placed in front of it. For image acquisition, the sample is moved through the light strip, which is stationary relative to the detector, to capture fluorescent and/or scattered light layer by layer using an area detector. The layered-image data thereby obtained can then be assembled into a data set corresponding to a three-dimensional image of the sample. In order to produce as thin a light strip as possible, the illumination objective must have a correspondingly high numerical aperture, and the free working distance of the illumination objective must be correspondingly large in order to prevent collision with the observation objective. This type of perpendicular arrangement of the two objectives can be disadvantageous for imaging certain samples, especially biological ones. For example, it is often not possible to place spherical objects in a collision-free manner under a right-angled objective arrangement. In addition to the extreme requirements in terms of sample preparation, unwanted shading also often occurs in the sample.

In a modified SPIM technique described in WO 2010012980 A1, illumination and detection are performed using the same objective. To this end, the entrance pupil of the objective is decentrally under-illuminated, i.e., the illumination beam passes through a portion of the entrance pupil that is offset transversely from the optical axis. A cylindrical lens arranged in front of the objective produces a light sheet in the sample, which light sheet is oblique with respect to the optical axis of the objective. The sample region illuminated by this light sheet is then in turn imaged by the objective onto a detector. However, this device is designed exclusively for oblique illumination of the sample by means of a light sheet and does not allow for any use deviating therefrom, and especially not for point-by-point confocal scanning of the sample or variation of the spatial light intensity distribution of the light sheet, and in particular, not for illumination by a light strip oriented perpendicular to the optical axis of the objective.

DE 10 2004 034 957 A1 describes an arrangement for microscopic observation of a sample through a microscope objective, in whose housing light guides for the light illuminating the sample are provided outside the lens optic. The illumination light initially proceeds parallel to the optical axis of the objective within the light guide, and then strikes small-aperture reflectors that are mounted on the objective housing and that, with the aid of additional imaging elements, focus the illuminating light into the sample perpendicularly to the optical axis of the microscope objective, and thus perpendicularly to the observation direction. Here too, illumination of the sample occurs in planar fashion according to the SPIM principle. Although the use of a microscope objective configured in this manner does eliminate the need to use an additional objective for the illuminating light, the special design of this special objective with additional light guides and reflectors is technically very complex, and expensive.

With the apparatus known from DE 10 2004 034 957 A1, the problem exists that only objects which fit within the maximum image field of the objective, between the oppositely located reflectors that deflect the illumination light onto the object, can be investigated. A large image field is available, however, only at low magnifications. High-magnification objectives, which as a general rule have a high numerical aperture, are not usable because the sample is larger than the maximum image field, and consequently does not fit between the oppositely located mirror surfaces. Objectives having a low aperture disadvantageously allow the formation of only a relatively thick light strip.

SUMMARY

In an embodiment, the present invention provides an arrangement for use in illuminating a sample in SPIM microscopy. An illumination objective is configured to receive and focus a light strip or a quasi-light strip. The quasi-light strip is made up of a light bundle continuously moved back and forth in a light-strip plane. A deflection apparatus is configured to deflect the light strip or the quasi-light strip, after the light strip or the quasi-light strip has passed through the illumination objective, in such a way that the light strip or the quasi-light strip propagates at an angle different from zero degrees with respect to an optical axis of the illumination objective. The illumination objective and the deflection apparatus are arranged movably relative to one another.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the present invention provides an arrangement for use in the context of illumination of a sample in SPIM microscopy, which arrangement offers reliable adjustability of the direction and/or location of irradiation onto the sample and at the same time permits the use of an illumination objective having a high numerical aperture, in particular when a sample to be investigated is larger than the image field of the illumination objective.

An embodiment of the arrangement is characterized in that a deflection apparatus is present which deflects the light strip or the quasi-light strip, after it has passed through the illumination objective, in such a way that it propagates at an angle different from zero degrees, in particular at a right angle, with respect to the optical axis of the illumination objective, the illumination objective and the deflection apparatus being arranged movably relative to one another.

Provision can be made in particular that the illumination objective and the deflection apparatus are arranged movably relative to one another in order to modify the incidence direction and/or irradiation location of the light strip and/or the quasi-light strip onto the sample.

The usability of high-aperture illumination objectives has the particular advantage that the light strip or quasi-light strip that strikes the sample can be particularly thin, which increases the resolution capability in the context of SPIM investigation.

In a particular embodiment, provision is made that the illumination objective and the deflection apparatus are arranged displaceably relative to one another. In particular, provision can advantageously be made that the illumination objective is arranged displaceably, in a plane perpendicular to its optical axis, relative to the deflection apparatus; and/or that the illumination objective is arranged displaceably, in a direction perpendicular to its optical axis, relative to the deflection apparatus.

In a particular embodiment, a compensation apparatus is present with which a misalignment of the light strip or quasi-light strip relative to the illumination objective caused by a movement of the illumination objective, in particular a spatial offset between the light strip or quasi-light strip and the illumination objective, can be compensated for.

Provision can be made, for example, that the compensation apparatus is embodied adjustably in order to compensate for different possible movements of the illumination objective.

Provision can be made in particular, alternatively or additionally, that the compensation apparatus is adjustable in synchronization with the movement of the illumination objective and/or of the deflection apparatus. This embodiment has the advantage that an additional working step for adapting the alignment to a selected relative position of the deflection apparatus relative to the illumination object is not necessary. Instead, what can be achieved thereby is that a correct alignment of the illumination beam path is always ensured irrespective of the relative position of the deflection apparatus relative to the illumination objective, with no need for the user to perform an alignment.

Provision can be made in particular in this context that the compensation apparatus is adjustable in synchronization with the movement of the illumination objective and/or of the deflection apparatus in such a way that the light strip or quasi-light strip is directed automatically into the entrance pupil of the illumination objective.

The aforesaid embodiments can be achieved, for example, by the fact that the compensation apparatus is mechanically coupled to the movement of the illumination objective and/or of the deflection apparatus. Alternatively, provision can also be made that the compensation apparatus comprises a dedicated positioning mechanism that is controlled electronically, preferably automatically, as a function of the relative position of the deflection apparatus relative to the illumination objective.

In a reliably constructed embodiment that permits precise adjustability of the illumination beam path, the compensation apparatus causes a beam offset. The latter is preferably dimensioned and oriented in such a way that an adaptation of the alignment of the illumination beam path to a relative position, selected by the user, of the deflection apparatus relative to the illumination objective is brought about by it.

For example, the compensation apparatus can comprise a transparent, plane-parallel plate, the plate plane being arranged at an angle different from 90 degrees with respect to the propagation direction of the light strip or quasi-light strip. Alternatively or additionally, provision can also be made that the compensation apparatus comprises a transparent, plane-parallel plate that is mounted rotatably, in particular around an axis parallel to the propagation direction of the light strip or of the quasi-light strip.

Provision can also be made that the compensation apparatus displaces a beam deflection device that generates a quasi-light strip by back-and-forth deflection. Provision can be made in particular that the beam deflection device is displaced synchronously together with the deflection apparatus relative to the illumination objective.

In a particular embodiment, the deflection apparatus comprises at least one at least partly reflective surface for deflecting the light strip or quasi-light strip. In particular, provision can additionally be made that the reflective surface is embodied as part of a plane mirror; or that the reflective surface is embodied at least in part on the inner side of a cone.

In another embodiment, provision is made that the deflection apparatus comprises multiple reflective surfaces; and that each surface has associated with it a reference position for the illumination objective in such a way that the light strip emerging from the illumination objective that is in a reference position, or the quasi-light strip emerging from the illumination objective, strikes the reflective surface associated with that reference position.

As already indicated above, provision can advantageously be made that the incidence direction of the light strip or of the quasi-light strip onto a sample, and/or the impact location of the light strip or of the quasi-light strip onto a sample, is adjustable by way of a relative movement between the illumination objective and the deflection apparatus.

In a special embodiment, the selection of a relative position of the deflection apparatus relative to the illumination objective can be set by users, for example by actuating suitable arranged adjusting screws. Provision can also be made, however, that the user, for example at a PC or another input device—preferably based on a graphical depiction of a front view of the object to be investigated or based on a graphical depiction of a placeholder of the object to be investigated—simply specifies the desired irradiation direction onto the sample, and the impact point. An electronic control system can calculate the control parameters necessary for implementing these specifications, and on the basis of the calculated control parameters can control suitably arranged positioning motors in order to bring about the necessary relative position and preferably also the necessary setting of the compensation apparatus.

In an advantageous embodiment, the deflection apparatus is embodied and intended to be arranged in stationary fashion relative to a sample to be investigated, while the illumination objective is arranged movably, in particular displaceably, in order to modify the incidence direction of the light strip or quasi-light strip onto the sample relative to the deflection apparatus. For example, the deflection apparatus can be arranged in stationary fashion on a microscope stand and/or on a sample stage.

Provision can also be made, in particular, that the deflection apparatus is arranged in stationary fashion relative to a sample to be investigated. For example, both the sample to be investigated and the deflection apparatus can be carried and/or held jointly by one common sample stage. In a particular embodiment, the deflection apparatus is arranged on the sample stage of an inverted microscope.

It is also possible for the deflection apparatus to be fastened movably on the illumination objective.

In a particular embodiment, the illumination object is an immersion objective. Provision can also be made that the illumination objective is an immersion objective; and that the illumination objective is embodied and intended to immerse, in particular together with the deflection apparatus, into a sample chamber or into a sample vessel that is filled with an optical medium that surrounds a sample to be illuminated.

In an advantageous embodiment, provision is made that the light strip entering the entrance pupil of the illumination objective, or the quasi-light strip entering the entrance pupil of the illumination objective, is at least as wide as the diameter of the entrance pupil; and/or that the light strip or quasi-light strip is coupled centrally into the illumination objective. Loss of illumination light power output is thereby advantageously avoided. A further result is that the imaging capability of the illumination objective is completely exploited, so that the sample can be illuminated with a light strip or quasi-light strip that is as thin as possible.

In a particular embodiment of the arrangement for use in the context of illumination of a sample, a beam shaping device is present which generates the light strip or quasi-light strip from a light bundle.

Provision can be made, for example, that firstly a light bundle largely round in cross section is generated, and the beam shaping device sweeps it rapidly back and forth in such a way that it forms a quasi-light strip. Provision can be made in particular that the beam shaping device sweeps the light bundle rapidly back and forth in such a way that the detectors receiving the detected light generate largely the same detection signals as in the case of illumination with a light strip generated, for example, with a cylindrical optic.

Provision can be made, for example, that the beam shaping device comprises a beam deflection device, in particular an oscillating mirror, that generates the quasi-light strip by sweeping a light bundle back and forth in a light-strip plane.

Alternatively to the generation of a quasi-light strip, provision can be made that the light strip is shaped, from a light bundle originally round in cross section, by means of a cylindrical optic, for example by means of one or more cylindrical lenses and/or cylindrical mirrors.

In a particular embodiment, a light source, in particular a laser, is provided which emits the light strip or emits a light bundle for generation of the light strip or quasi-light strip.

Advantageously, the arrangement for illumination described above with reference to various details and embodiments can be embodied as a module that in particular is outer-space-capable. The embodiment as a module can advantageously be such that the user can retrofit an existing microscope or microscope stand by simply coupling on the module for SPIM investigation of a sample. Preferably the individual components of the module are pre-aligned.

Provision can be made in particular that the arrangement is embodied as a module that in particular is outer-space-capable, at least one coupling means, in particular a guidance means and/or retaining means, being present, which means enables accurately positioned coupling to an (in particular, inverted) microscope or to a microscope stand.

In a very particularly flexibly usable embodiment of the arrangement as a module, a beam shaping device that generates the light strip or quasi-light strip from a light bundle is integrated. Alternatively or additionally, provision can also be made that a light source, in particular a laser, that emits the light strip or that emits a light bundle for generation of the light strip or quasi-light strip, is integrated into the module. These embodiments have the particular advantage that the user is not dependent on the light source actually intended for other applications, or on the beam deflection actually intended for other applications, of a microscope. Instead, the module can simply be flange-mounted and used with no need to perform particular adaptations to the remaining beam path of the microscope or microscope stand. The capability is thereby also created of using the module on microscopes or microscope stands that do not comprise or cannot make available their own light source or beam deflection device.

Using the arrangement according to the present invention for illumination makes it possible to furnish a microscope that permits SPIM investigation even of larger samples using a thin light strip and thus with high resolution capability.

A microscope that is actually designed as a confocal scanning microscope or as a multi-photon microscope can be used, for example, to implement such a microscope. The retrofitting necessary therefor can in fact be performed by the end user, especially if the necessary components are provided in pre-aligned fashion and/or in a modular design.

Provision can be made in particular that the beam deflection device of a scanning microscope is used to generate the quasi-light strip.

In a microscope having the arrangement according to the present invention for illumination, an observation objective separate from the illumination objective can be present. Provision can be made in particular that an observation objective is present through which the detected light proceeding from a sample is directed to a detector; and/or that an observation objective is present whose optical axis is arranged parallel to or coaxially with the optical axis of the illumination objective.

Detected light proceeding from the layer of the sample illuminated by means of the light strip or quasi-light strip can be directed through the observation objective to a detection apparatus, for example a CCD camera. The observation objective, optionally together with downstream further optical components, preferably images the layer of the sample illuminated by means of the light strip or quasi-light strip onto the light-sensitive area of an area detector. Alternatively, it is also possible to scan the layer of the sample illuminated by means of the light strip or quasi-light strip point by point, in particular in a confocal arrangement.

The microscope can advantageously comprise a compensation apparatus with which the beam path of the microscope is adaptable to the respectively current relative position of the illumination objective and deflection apparatus. As already described in detail, the compensation apparatus can be part of the arrangement for illumination. It is also possible, however, alternatively or additionally, for the microscope to comprise, outside the arrangement for illumination, a compensation apparatus with which the beam path of the microscope is adaptable to the respectively current relative position of the illumination objective and deflection apparatus.

In particular, a compensation apparatus can be present with which specifically the observation beam path of the microscope is adaptable to the respectively current relative position of the illumination objective and deflection apparatus.

A compensation apparatus of the microscope which is arranged outside the arrangement for illumination can also advantageously be embodied adjustably in order to compensate for different possible movements of the illumination objective and/or of the deflection apparatus. Provision can also be made that a compensation apparatus of this kind is adjustable in synchronization with the movement of the illumination objective and/or of the deflection apparatus; and/or that the compensation apparatus is adjustable in synchronization with the movement of the illumination objective and/or of the deflection apparatus in such a way that the detected light coming from the observation objective is directed to a detector. Alternatively or additionally, provision can also be made that a compensation apparatus of this kind is coupled mechanically to the movement of the illumination objective and/or of the deflection apparatus. In particular, provision can also be made that a compensation apparatus of this kind is arranged in the detection beam path of the microscope.

By analogy with what was described regarding the compensation apparatus of the arrangement for illumination, provision can also be made, for a compensation apparatus of the microscope which is arranged outside the arrangement for illumination, that a compensation apparatus of this kind causes a beam offset; and/or that a compensation apparatus of this kind comprises a transparent, plane-parallel plate, the plate plane being arranged at an angle different from 90 degrees with respect to the propagation direction of the detected light. The incidence angle different from zero degrees results in a beam offset that can be utilized for compensation.

In particular, provision can advantageously be made that the compensation apparatus comprises a transparent, plane-parallel plate that is mounted rotatably in particular around an axis parallel to the propagation direction of the detected light.

Further purposes, advantages, features, and possible applications of the present invention are evident from the description below of an exemplifying embodiment with reference to the drawings. All features described and/or graphically depicted constitute, individually or in any useful combination, the subject matter of the present invention, irrespective of how they are grouped in the Claims or their internal references.

Figure 1:
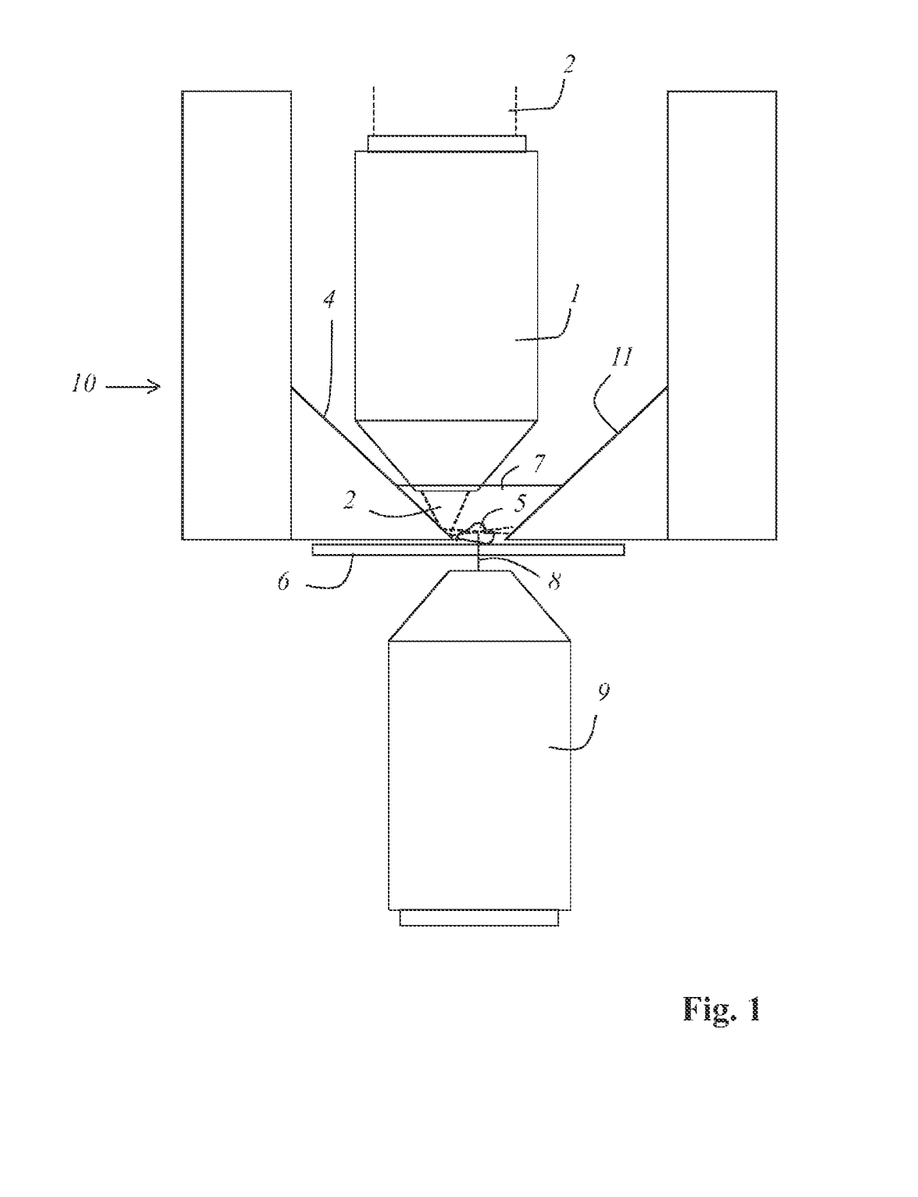
FIG. 1 shows an exemplifying embodiment of an arrangement according to the present invention for used in the context of illumination of a sample in SPIM microscopy.

FIG. 1 shows an exemplifying embodiment of an arrangement according to the present invention for use in the context of illumination of a sample in SPIM microscopy. The arrangement comprises an illumination objective 1 that receives and focuses a light strip 2. Instead of light strip 2 there could also be a quasi-light strip 3 that is made up of a light bundle continuously moved back and forth in a light-strip plane.

The received light strip 2 is focused by illumination objective 1 and emerges from the front lens of illumination objective 1. Light strip 2 then strikes a first reflection surface 4 of a deflection apparatus 10 and is deflected by the latter through approximately 90 degrees, so that it propagates further at an angle different from zero degrees, in particular at a right angle, with respect to the optical axis of illumination objective 1. It then strikes sample 5 to be investigated, which is located on a sample stage 6 in an immersion fluid 7 into which the front lens of illumination objective 1 is also immersed.

Detected light 8 (indicated merely schematically) proceeding from the sample is directed, by means of an observation objective 9 separate from illumination objective 1, to a detector not depicted in this Figure.

The optical axis of observation objective 9 is arranged parallel to the optical axis of the illumination objective.

Figure 2:
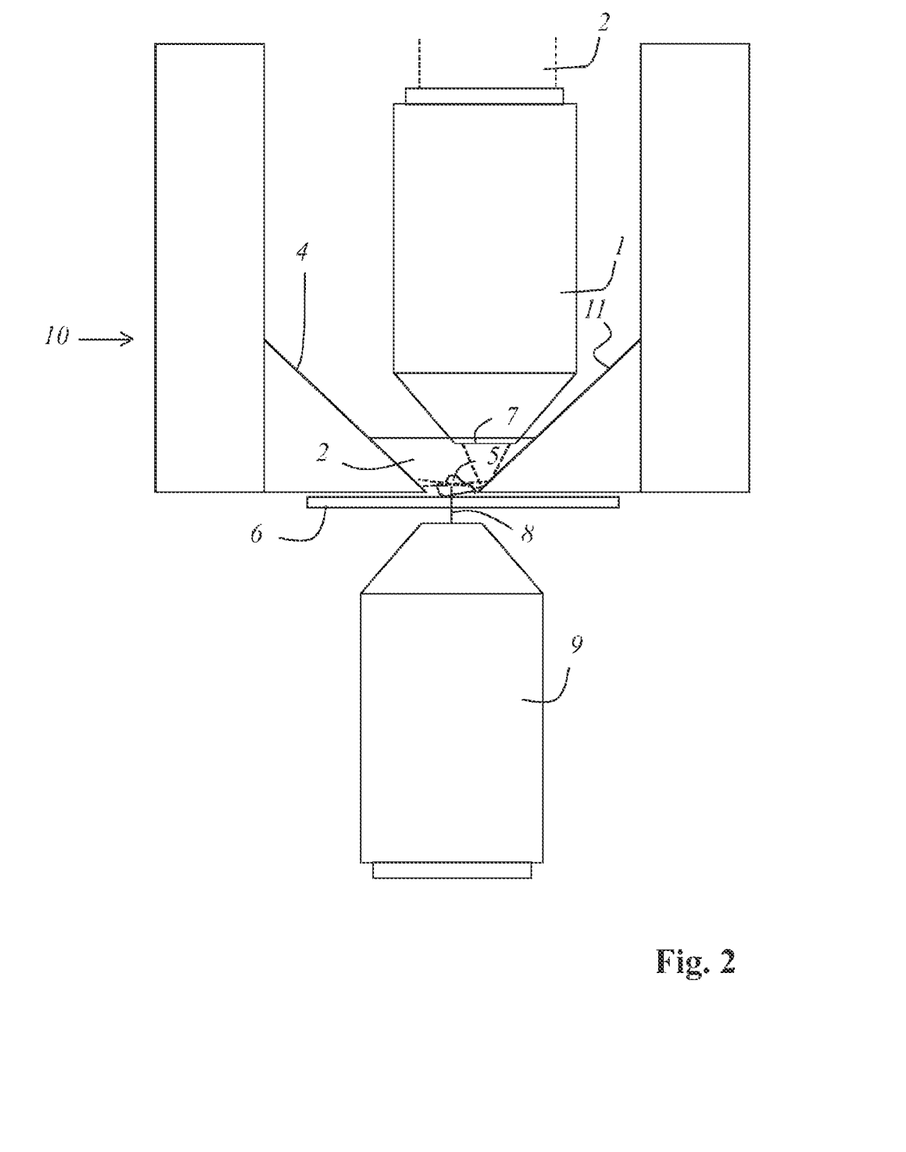
FIG. 2 shows the exemplifying embodiment in which a different irradiation direction is set.

Illumination objective 1 and deflection apparatus 10 are arranged movably relative to one another. In order to modify the incidence direction of light strip 2 onto sample 5, illumination objective 1 is displaced linearly perpendicularly to its optical axis so that light strip 2 emerging from the front lens of illumination objective 1 strikes a second reflection surface 11 of deflection apparatus 10 instead of first reflection surface 4. This situation is depicted in FIG. 2.

Second reflection surface 11 is arranged in a plane that is at an angle of 90 degrees with respect to the plane in which first reflection surface 4 is arranged. Light strip 2 is deflected by second reflection surface 11 of deflection apparatus 10 through approximately 90 degrees, so that it propagates further at an angle different from zero degrees, in particular at a right angle, with respect to the optical axis of illumination objective 1. The propagation direction is, however, opposite to the previous propagation direction. The position of sample 5, of deflection apparatus 10, and of observation objective 9 preferably remains unchanged.

Figure 3:
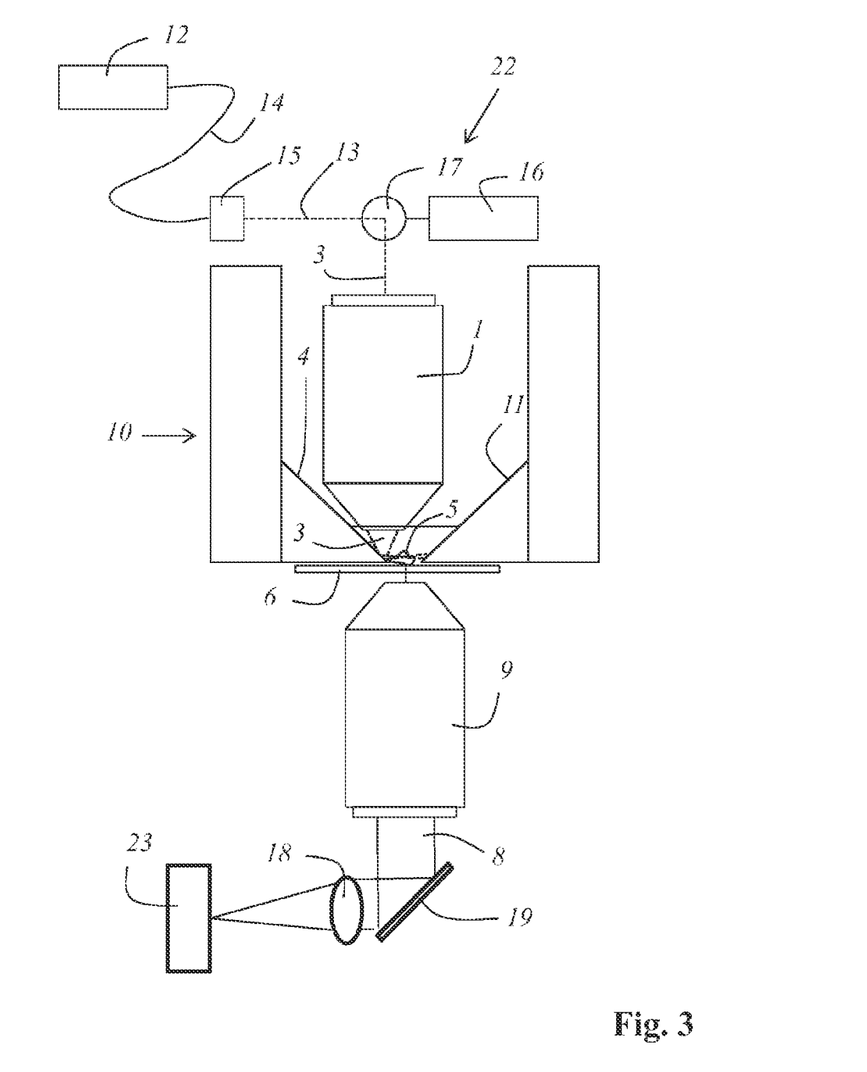
FIG. 3 shows a different exemplifying embodiment of an arrangement according to the present invention having a beam deflection device for generating a quasi-light strip.

FIG. 3 shows a different exemplifying embodiment of an arrangement according to the present invention, having a beam deflection device 22 for generating a quasi-light strip 3. Firstly a light bundle 13 largely round in cross section is generated by a light source 12, which bundle, after transport through a light-guiding fiber 14 at whose end a fiber coupler 15 is arranged, strikes an oscillating mirror 17, driven by a galvanometer 16, of beam deflection device 22. Light beam 12 is swept back and forth sufficiently rapidly that it forms quasi-light strip 3.

As already described with reference to the exemplifying embodiment depicted in FIG. 1, in order to modify the incidence direction of light strip 2 onto sample 5, illumination objective 1 is displaced linearly perpendicularly to its optical axis. This situation is depicted in FIG. 4.

In order to bring about the beam offset of light strip 3 coming from beam deflection device 22, provision is made that the compensation apparatus (not depicted) moves beam deflection device 22, preferably automatically, synchronously with illumination objective 1 in the same direction.

FIGS. 3 to 10 schematically show an area detector 23 that receives detected light 8 proceeding from sample 5. The sample plane illuminated by quasi-light strip 3 is imaged onto the detector area of area detector 23 by means of observation objective 9 of a further optic 18. The detection beam path is folded by means of a mirror 19.

Figure 4:
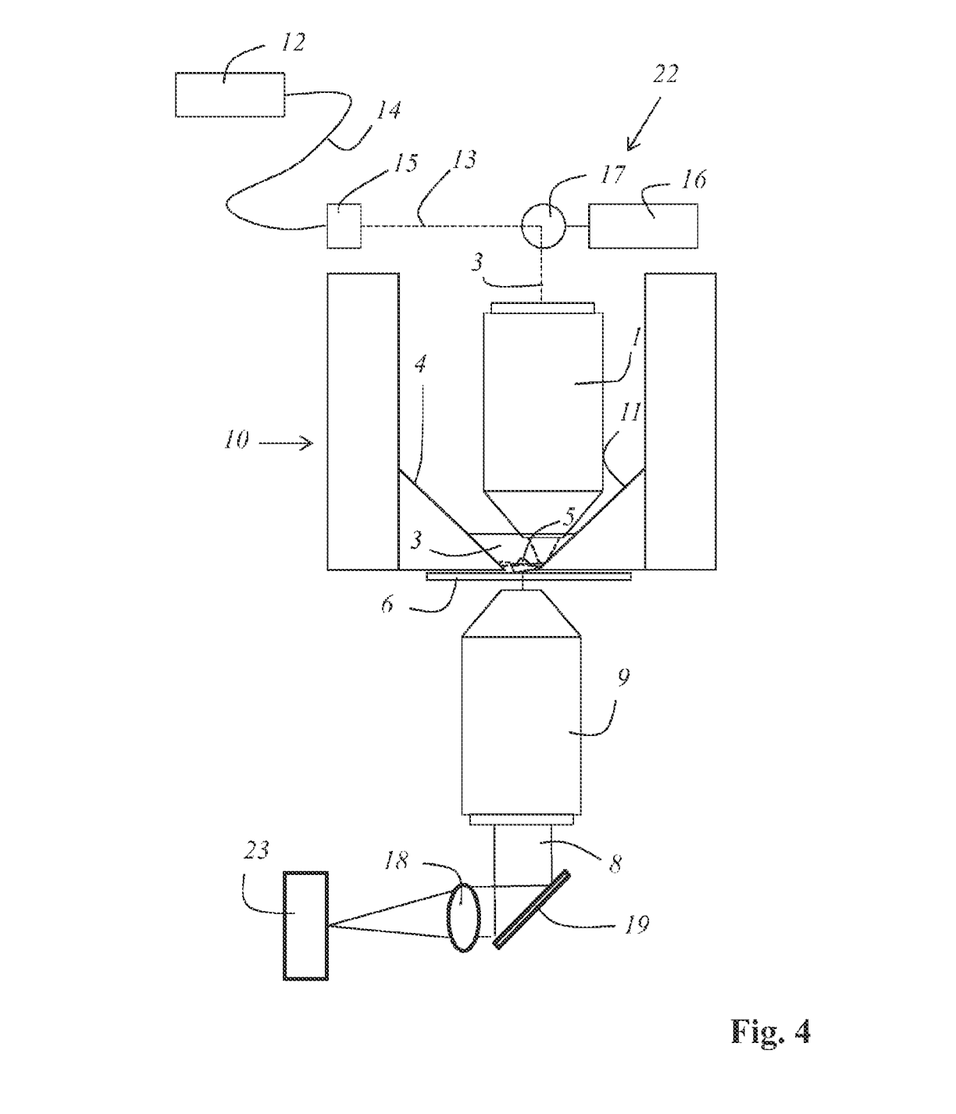
FIG. 4 shows the different exemplifying embodiment in which a different irradiation direction is set.
Figure 5:
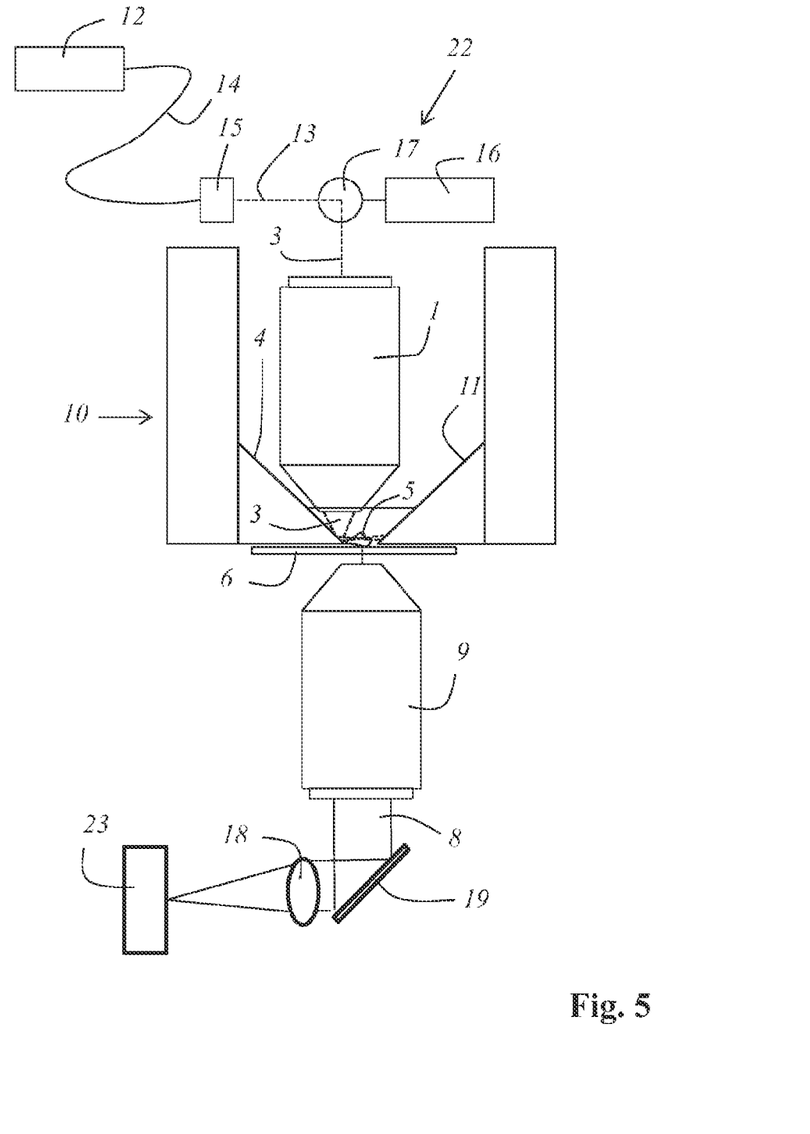
FIG. 5 shows a further exemplifying embodiment of an arrangement according to the present invention having a beam deflection device for generating a quasi-light strip.
Figure 6:
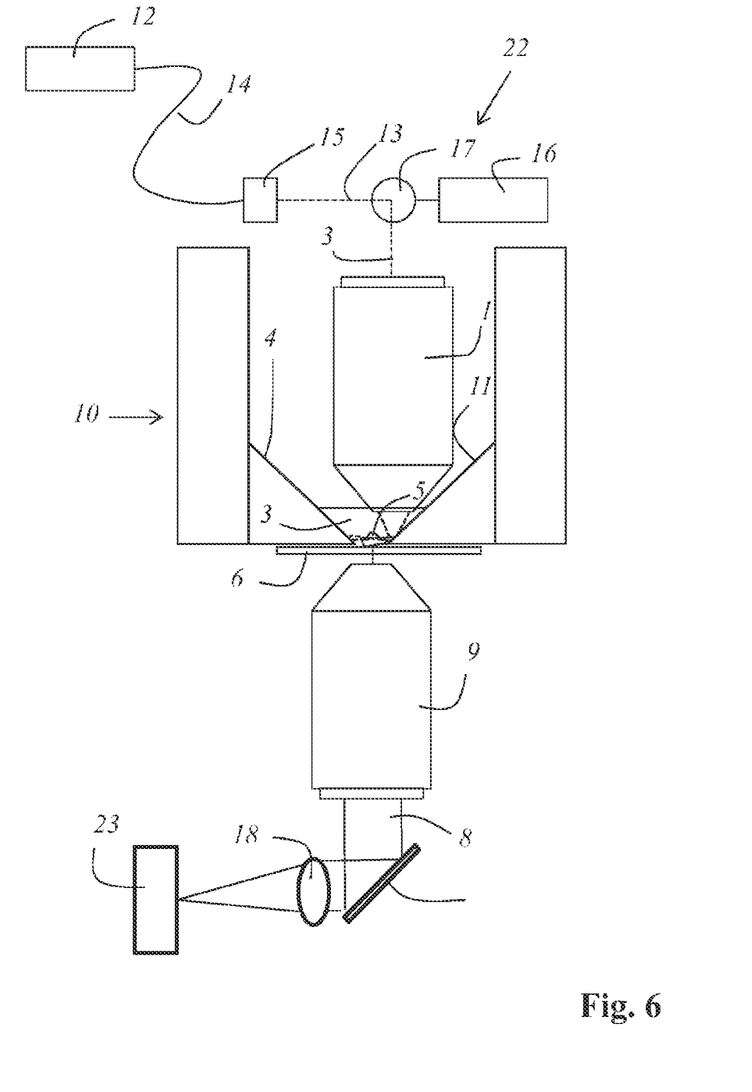
FIG. 6 shows the further exemplifying embodiment in which a different irradiation direction is set.

The further exemplifying embodiment depicted in FIGS. 5 and 6 differs from the exemplifying embodiment depicted in FIGS. 3 and 4 in that fiber coupler 15 having the coupled-on end of fibers 14 is also additionally displaced by the compensation apparatus. This embodiment is particularly insensitive to misalignment.

Figure 7:
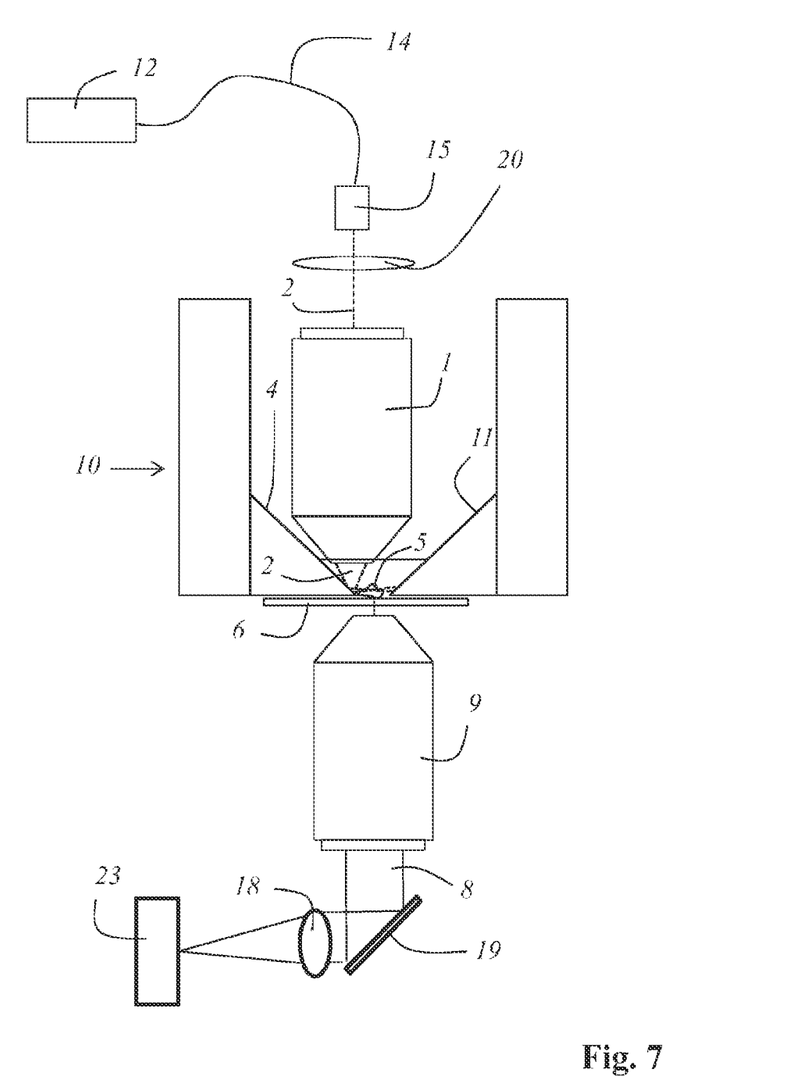
FIG. 7 shows a fourth exemplifying embodiment of an arrangement according to the present invention having cylindrical optic for generating a quasi-light strip.
Figure 8:
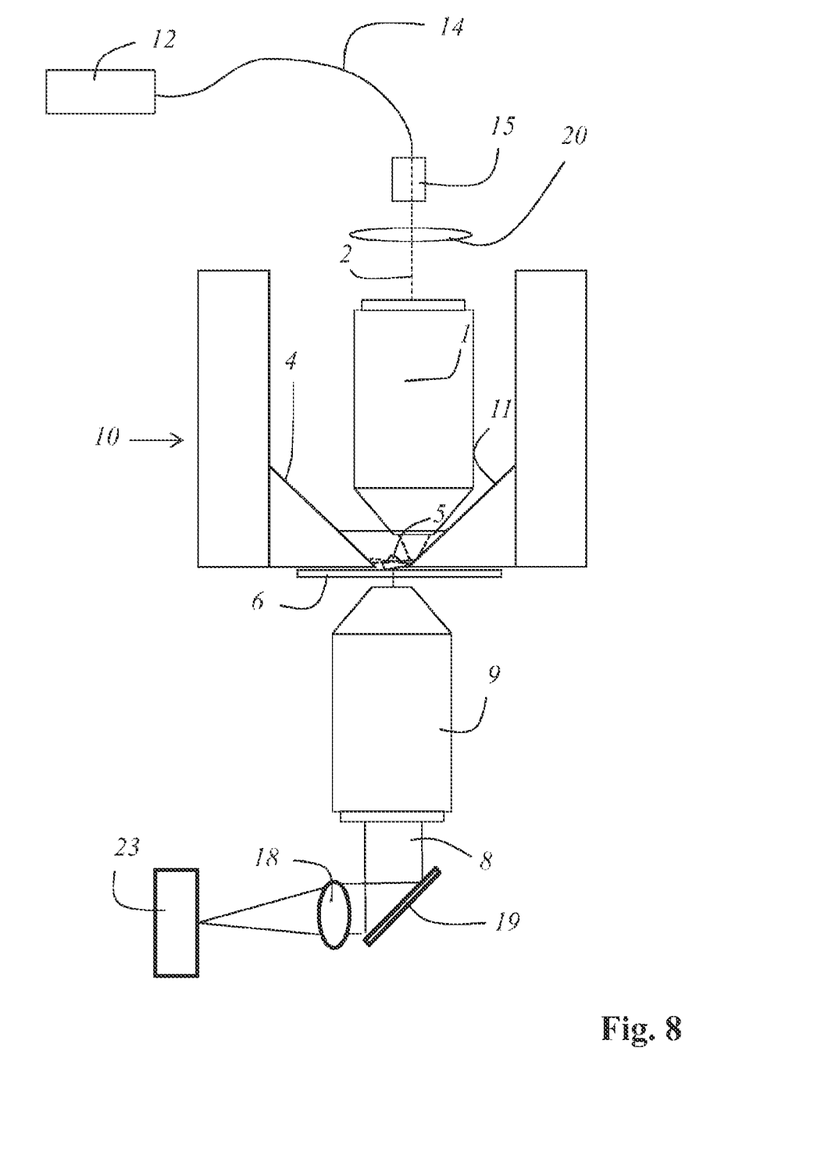
FIG. 8 shows the fourth exemplifying embodiment in which a different irradiation direction is set.

FIGS. 7 and 8 show a fourth exemplifying embodiment of an arrangement according to the present invention, having a cylindrical optic 20 for generating a light strip 2. Firstly, a light bundle 13 largely round in cross section is generated by a light source 12, and said bundle, after transport through a light-guiding fiber 14 at whose end a fiber coupler 15 is arranged, strikes cylindrical optic 20.

With this embodiment as well, both fiber coupler 15 and cylindrical optic 20 are displaced linearly by the compensation apparatus, synchronously with illumination objective 1, when the illumination direction is to be modified.

Figure 9:
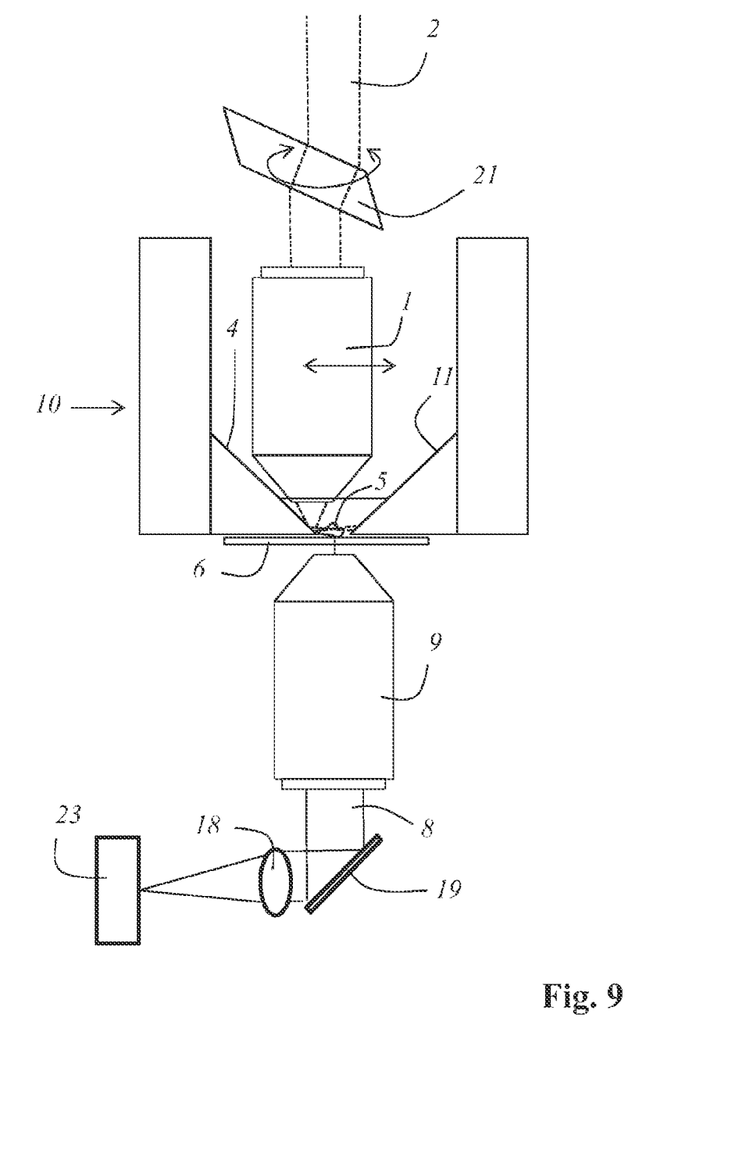
FIG. 9 shows a fifth exemplifying embodiment of an arrangement according to the present invention having a compensation apparatus that comprises a plane-parallel plate.
Figure 10:
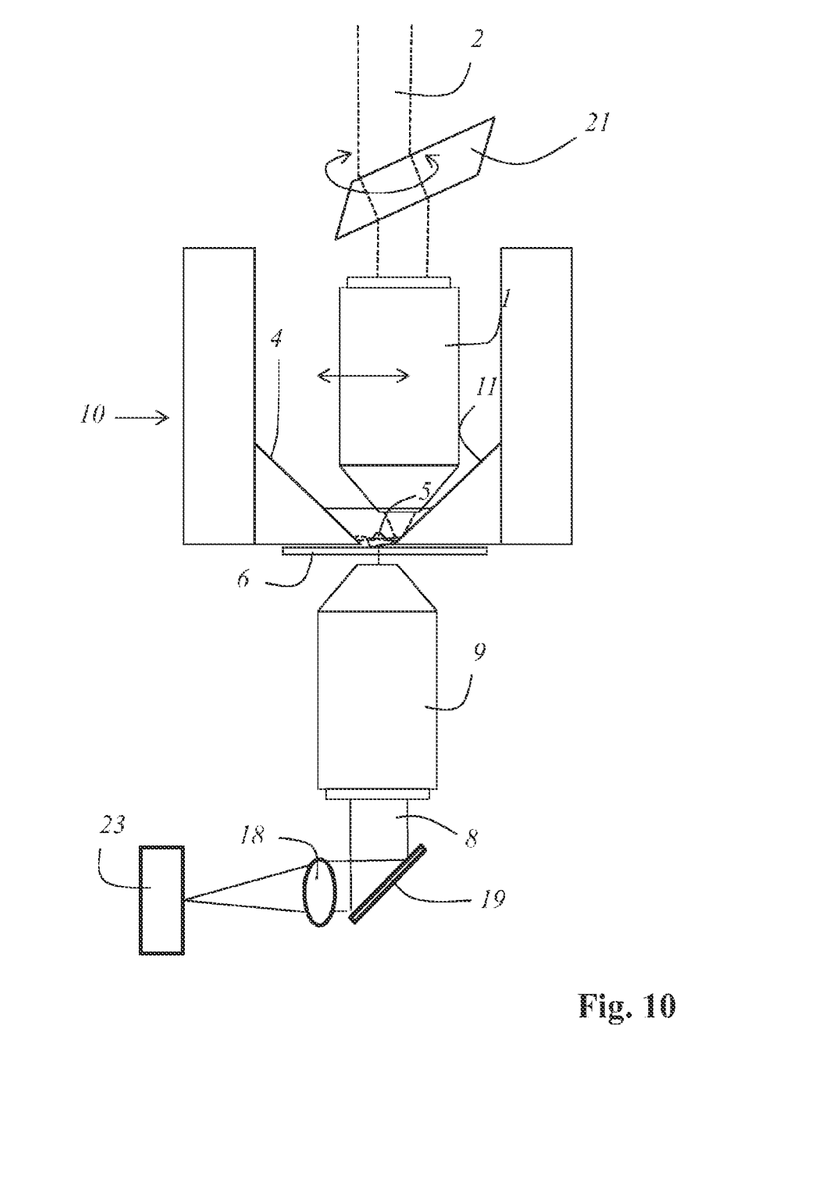
FIG. 10 shows the fifth exemplifying embodiment in which a different irradiation direction is set.

FIGS. 9 and 10 show a fifth exemplifying embodiment of an arrangement according to the present invention having a compensation apparatus that comprises a plane-parallel plate 21. In this embodiment, plane-parallel plate 21 is rotated, preferably automatically, through 180 degrees around the optical axis when the illumination objective is displaced, as discussed above, in order to modify the illumination direction.

Figure 11:
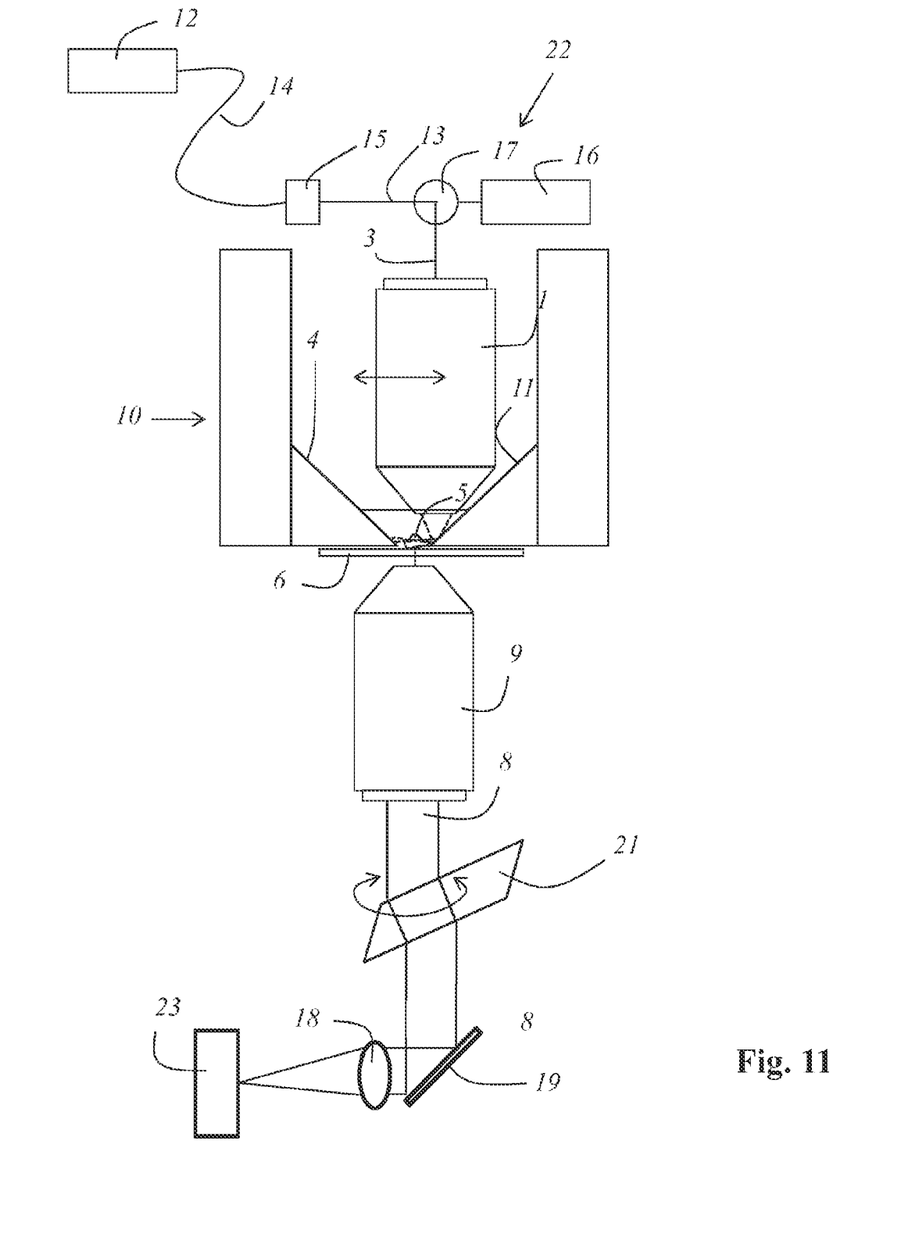
FIG. 11 is a detail view of an exemplifying embodiment of a microscope according to the present invention having a compensation apparatus in the detection beam path.

FIG. 11 is a detail view of an exemplifying embodiment of a microscope according to the present invention having a compensation apparatus in the detection beam path.

The apparatus for illumination comprises a beam deflection device 22 for generating a quasi-light strip 3. Firstly a light bundle 13 largely round in cross section is generated by a light source 12, and said bundle, after transport through a light-guiding fiber 14 at whose end a fiber coupler 15 is arranged, strikes an oscillating mirror 17, driven by a galvanometer 16, of beam deflection device 22. Light bundle 12 is swept back and forth sufficiently quickly that it forms quasi-light strip 3.

With this exemplifying embodiment of a microscope, the arrangement for illumination has no compensation apparatus. Instead, there is provided in the detection beam path, as a compensation apparatus, a plane-parallel plate 21 that can be rotated around the optical axis, preferably synchronously with a relative movement of the illumination objective and deflection apparatus. The rotational position is always selected so that detected light 8 arrives at detector 23. With this exemplifying embodiment the offset between the illumination objective and the observation objective is, so to speak, compensated for by means of a beam offset of the detected light that is produced by the compensation apparatus, namely the obliquely placed compensation plate 21. The magnitude and direction of the beam offset can be adjusted by (preferably automatic) selection of the obliquity and rotational position of compensation plate 21.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An arrangement for use in illuminating a sample in SPIM microscopy, comprising: an illumination objective configured to receive and focus a light strip or a quasi-light strip, the quasi-light strip being made up of a light bundle continuously moved back and forth in a light strip plane, and a deflection apparatus configured to deflect the light strip or the quasi-light strip, after the light strip or the quasi light strip has passed through the illumination objective, to an angle different from zero degrees with respect to an optical axis of the illumination objective, wherein the illumination objective and the deflection apparatus are arranged movable relative to one another in a direction perpendicular to an optical axis of the illumination objective.

2. The arrangement according to claim 1, further comprising:
   a. a compensation apparatus configured to adapt a beam path of the arrangement to a respectively current relative position of the illumination objective and of the deflection apparatus, or
   b. a compensation apparatus configured to compensate for a misalignment or a spatial offset of the light strip or the quasi-light strip relative to the illumination objective caused by a movement of the illumination objective.

3. The arrangement according to claim 2, wherein:
   a. the compensation apparatus is embodied adjustably so as to compensate for different possible movements of at least one of the illumination objective and the deflection apparatus, or b. the compensation apparatus is adjustable in synchronization with the movements of the at least one of the illumination objective and the deflection apparatus, or
c. the compensation apparatus is adjustable in synchronization with the movements of the at least one of the illumination objective and the deflection apparatus, whereby the light strip or the quasi-light strip is directed automatically into the entrance pupil of the illumination objective, or
d. the compensation apparatus is mechanically coupled to the movements of the at least one of the illumination objective and the deflection apparatus.

4. The arrangement according to claim 2, wherein:
a. the compensation apparatus is configured to cause a beam offset, or
b. the compensation apparatus comprises a transparent, plane-parallel plate, a plate plane being arranged at an angle different from 90 degrees with respect to the propagation direction or the optical axis of the light strip or the quasi-light strip, or
c. the compensation apparatus comprises a transparent, plane-parallel plate that is mounted rotatably or rotatably around an axis parallel to the propagation direction of the light strip or the quasi-light strip, or
d. the compensation apparatus is configured to displace a beam deflection configured to generate the quasi-light strip by back-and-forth deflection.

5. The arrangement according to claim 1, wherein:
a. the deflection apparatus comprises at least one at least partly reflective surface for deflecting the light strip or the quasi-light strip, or
b. the deflection apparatus comprises at least one at least partly reflective surface for deflecting the light strip or the quasi-light strip, the reflective surface being embodied as part of a plane mirror, or as at least in part on an inner side of a cone.

6. The arrangement according to claim 1, wherein the deflection apparatus comprises a plurality of reflective surfaces each of which is associated to a respective reference position for the illumination objective, whereby the light strip emerging from the illumination objective that is in a first one of the reference positions, or the quasi-light strip emerging from the illumination objective, strikes the reflective surface associated with the first one of the reference positions.

7. The arrangement according to claim 1, wherein an incidence direction of the light strip or the quasi-light strip onto a sample, or an impact location of the light strip or of the quasi-light strip onto the sample, is adjustable by way of a relative movement between the illumination objective and the deflection apparatus.

8. The arrangement according to claim 1, wherein the deflection apparatus is embodied and configured to be arranged in a stationary fashion relative to a sample to be investigated, while the illumination objective is arranged movably or displaceably so as to modify an incidence direction of the light strip or the quasi-light strip onto the sample relative to the deflection apparatus.

9. The arrangement according to claim 1, wherein the deflection apparatus is fastened movably on the illumination objective.

10. The arrangement according to claim 1, wherein:
a. the illumination object is an immersion objective, or
b. the illumination objective is an immersion objective and the illumination objective is embodied and configured to immerse, alone or together with the deflection apparatus, into a sample chamber or into a sample vessel that is filled with an optical medium that surrounds a sample to be illuminated.

11. The arrangement according to claim 1, wherein:
a. the light strip or the quasi-light strip entering an entrance pupil of the illumination objective is at least as wide as a diameter of the entrance pupil, or
b. the light strip or the quasi-light strip is coupled centrally into the illumination objective.

12. The arrangement according to claim 1, further comprising a beam shaping device configured to generate the light strip or the quasi-light strip from the light bundle.

13. The arrangement to claim 12, wherein the beam shaping device:
a. comprises a beam deflection device or an oscillating mirror configured to generate the quasi-light strip by sweeping the light bundle back and forth in the light-strip plane, or
b. comprises a cylindrical optic configured to shape the light strip from the light bundle.

14. The arrangement according to claim 1, further comprising a light source or a laser configured to emit the light strip or to emit the light bundle for generation of the light strip or the quasi-light strip.

15. The arrangement according claim 1, wherein:
a. the arrangement is embodied as a module or as a module that is outer-space-capable, or
b. the arrangement is embodied as the module comprising at least one coupling means or a guidance means or retaining means, which means enables accurately positioned coupling to a microscope or to a microscope stand.

16. A microscope having an arrangement according to claim 1.

17. The microscope according to claim 16, further comprising:
a. an observation objective separate from the illumination objective, or
b. an observation objective through which detected light proceeding from a sample is directed to a detector, or
c. an observation objective whose optical axis is arranged parallel to or coaxially with the optical axis of the illumination objective.

18. The microscope according to claim 16, further comprising:
a compensation apparatus with which the beam path of the microscope is adaptable to a respectively current relative position of the illumination objective and of the deflection apparatus.

19. The microscope according to claim 18, wherein:
the compensation apparatus is adjustable in synchronization with movements of at least one of the illumination objective and the deflection apparatus, whereby the detected light coming from the observation objective is directed to a detector.

20. The microscope according to claim 19, wherein:
a. the compensation apparatus is arranged in a detection beam path of the microscope, or
b. the compensation apparatus comprises a transparent, plane-parallel plate, a plate plane being arranged at an angle different from 90 degrees with respect to an optical axis of the detected light, or
c. the compensation apparatus comprises a transparent, plane-parallel plate that is mounted rotatably or rotatably around an axis parallel to a propagation direction of the detected light.

21. The arrangement according to claim 1, wherein the deflection apparatus is configured to deflect the light strip or the quasi-light strip to a right angle with respect to the optical axis of the illumination objective.

* * * * *